US011858004B2

(12) United States Patent
Leinonen

(10) Patent No.: US 11,858,004 B2
(45) Date of Patent: Jan. 2, 2024

(54) MOBILE MULTI-DECK SCREENING APPARATUS PILE CONTROL

(71) Applicant: Metso Outotec Finland Oy, Tampere (FI)

(72) Inventor: Timo Leinonen, Tampere (FI)

(73) Assignee: Metso Outotec Finland Oy, Tampere (FI)

( * ) Notice: Subject to any disclaimer, the term of this patent is extended or adjusted under 35 U.S.C. 154(b) by 0 days.

(21) Appl. No.: 17/786,014

(22) PCT Filed: Dec. 17, 2020

(86) PCT No.: PCT/FI2020/050846
§ 371 (c)(1),
(2) Date: Jun. 16, 2022

(87) PCT Pub. No.: WO2021/123502
PCT Pub. Date: Jun. 24, 2021

(65) Prior Publication Data
US 2023/0039373 A1 Feb. 9, 2023

(30) Foreign Application Priority Data
Dec. 18, 2019 (FI) ..................................... 20196093

(51) Int. Cl.
*B07B 13/16* (2006.01)
*B07B 1/00* (2006.01)

(52) U.S. Cl.
CPC .............. *B07B 13/16* (2013.01); *B07B 1/005* (2013.01); *B07B 2201/04* (2013.01)

(58) Field of Classification Search
CPC ...... B07B 1/005; B07B 13/16; B07B 2201/04
See application file for complete search history.

(56) References Cited

U.S. PATENT DOCUMENTS 5,248,042 A * 9/1993 Kuhmonen ............. B07B 1/524 209/393
6,543,622 B1 4/2003 Fridman
(Continued)

FOREIGN PATENT DOCUMENTS

EP 1136130 A2 9/2001
EP 3482836 A1 5/2019
(Continued)

OTHER PUBLICATIONS

Search Report for Finnish Patent Application No. 20196093 dated Aug. 12, 2020.
(Continued)

*Primary Examiner* — Joseph C Rodriguez
(74) *Attorney, Agent, or Firm* — Andrus Intellectual Property Law, LLP

(57) ABSTRACT

A mobile multi-deck screening apparatus receives material for screening with a feeder of the apparatus. A first screen deck receives and screens material from the feed. A second screen deck receives an undersize fraction of the first screen deck. First and second discharge conveyors output oversize fractions of the first and second screen decks. The first and second discharge conveyors pivot to operate in directions selected between a first direction and a second direction. The first direction is forward. The second direction differs from the first direction. One or both of the first and second discharge conveyors is/are pivotable from one side to an opposite side of the apparatus. Oversize fraction material of the first screen deck and oversize fraction material of the second screen deck are selectively discharged in a common pile.

13 Claims, 4 Drawing Sheets

(56) References Cited

U.S. PATENT DOCUMENTS

| | | | | |
|---|---|---|---|---|
| 7,882,958 | B2 * | 2/2011 | Doppstadt | B07B 1/15 209/244 |
| 8,505,738 | B2 * | 8/2013 | O'Keeffe | B07B 1/46 209/421 |
| 9,376,260 | B2 | 6/2016 | Saarinen | |
| 11,511,319 | B2 * | 11/2022 | Mcdevitt | B07B 13/16 |
| 2002/0056668 | A1 * | 5/2002 | Dube | B07B 9/00 209/672 |
| 2008/0041984 | A1 | 2/2008 | Sauser et al. | |
| 2015/0027932 | A1 * | 1/2015 | Andersen | B07B 15/00 209/241 |
| 2015/0224540 | A1 * | 8/2015 | Robinson | B07B 1/284 209/325 |
| 2016/0354806 | A1 * | 12/2016 | Eberts | B07B 1/22 |
| 2018/0065153 | A1 | 3/2018 | Andersen | |
| 2018/0334332 | A1 | 11/2018 | Eberts | |
| 2018/0339299 | A1 * | 11/2018 | Pratt | B03B 9/00 |
| 2021/0069750 | A1 * | 3/2021 | Mcdevitt | B07B 13/16 |
| 2021/0101181 | A1 * | 4/2021 | Belosevic | B07B 13/16 |

FOREIGN PATENT DOCUMENTS

| | | | | | |
|---|---|---|---|---|---|
| GB | 1480688 | A | | 7/1977 | |
| GB | 2309923 | A | | 8/1997 | |
| GB | 2528257 | A | * | 1/2016 | B03B 11/00 |
| GB | 2528257 | A | | 1/2016 | |
| IE | S74896 | B2 | | 8/1997 | |
| WO | 9737777 | A1 | | 10/1997 | |
| WO | 2019076488 | A1 | | 4/2019 | |

OTHER PUBLICATIONS

International Search Report and Written Opinion for International Application No. PCT/FI2020/050846 dated Mar. 25, 2021.

International Preliminary Report on Patentability for International Application No. PCT/FI2020/050846 dated Apr. 4, 2022.

* cited by examiner receiving material for screening with a feeder of the apparatus 805

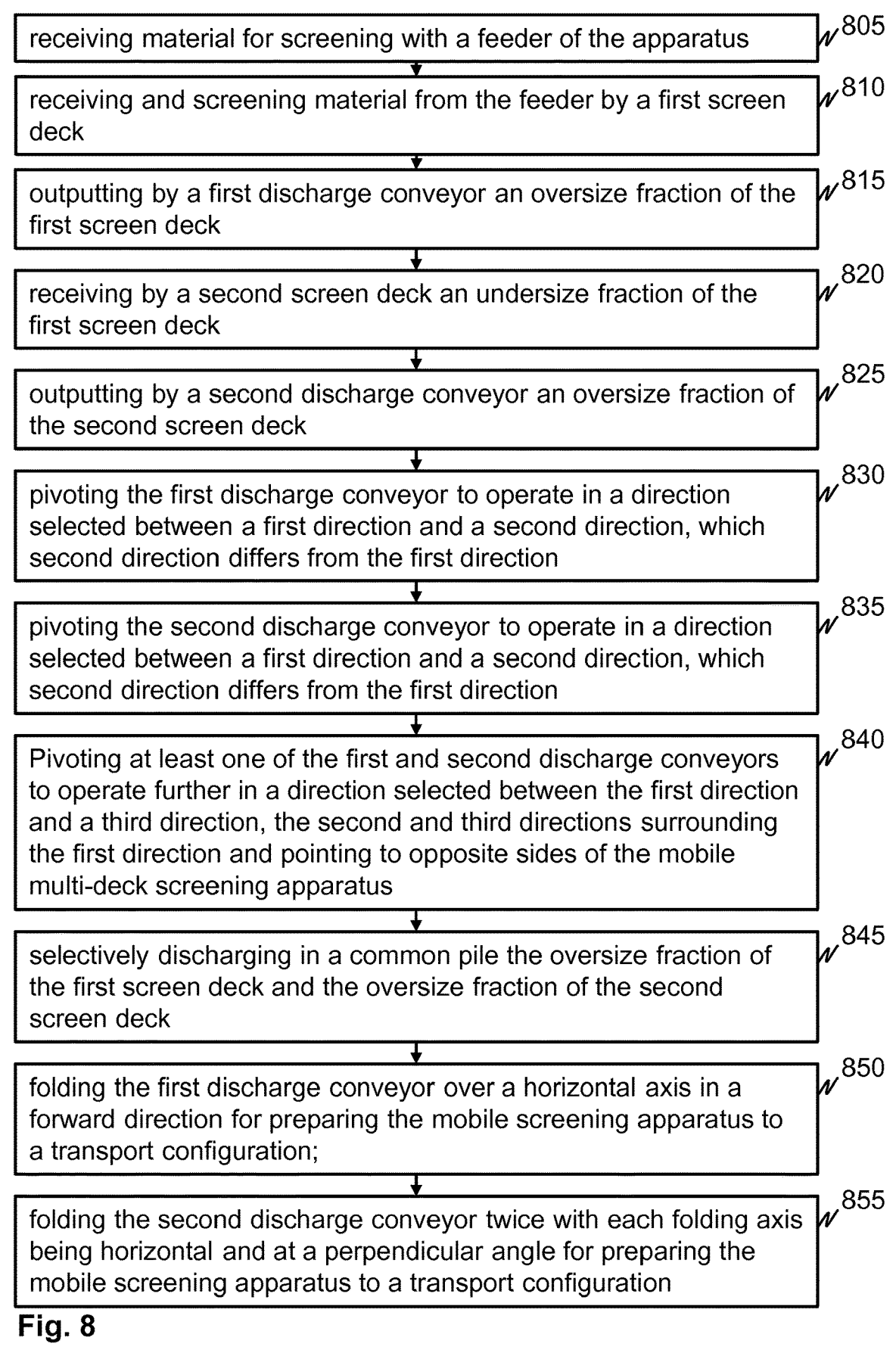

↓ receiving and screening material from the feeder by a first screen deck 810

↓ outputting by a first discharge conveyor an oversize fraction of the first screen deck 815

↓ receiving by a second screen deck an undersize fraction of the first screen deck 820

↓ outputting by a second discharge conveyor an oversize fraction of the second screen deck 825

↓ pivoting the first discharge conveyor to operate in a direction selected between a first direction and a second direction, which second direction differs from the first direction 830

↓ pivoting the second discharge conveyor to operate in a direction selected between a first direction and a second direction, which second direction differs from the first direction 835

↓

Pivoting at least one of the first and second discharge conveyors to operate further in a direction selected between the first direction and a third direction, the second and third directions surrounding the first direction and pointing to opposite sides of the mobile multi-deck screening apparatus 840

↓ selectively discharging in a common pile the oversize fraction of the first screen deck and the oversize fraction of the second screen deck 845

↓ folding the first discharge conveyor over a horizontal axis in a forward direction for preparing the mobile screening apparatus to a transport configuration; 850

↓ folding the second discharge conveyor twice with each folding axis being horizontal and at a perpendicular angle for preparing the mobile screening apparatus to a transport configuration 855

Fig. 8

MOBILE MULTI-DECK SCREENING APPARATUS PILE CONTROL

CROSS-REFERENCE TO RELATED APPLICATIONS

This application is the U.S. national stage application of International Application PCT/FI2020/050846, filed Dec. 17, 2020, which international application was published on Jun. 24, 2021, as International Publication WO 2021/123502 A1 in the English language. The International Application claims priority of Finnish Patent Application No. 20196093 filed Dec. 18, 2019.

TECHNICAL FIELD

The present invention generally relates to pile control of a mobile multi-deck screening apparatus.

BACKGROUND ART

This section illustrates useful background information without admission of any technique described herein representative of the state of the art.

Multi-deck screens have plural screening decks in a vertical succession or stack such that an undersize fraction of one screen deck passes through that screen deck and enters the next screen deck (if any) below. Intermediate conveyors or guides may be provided to bring passed undersize fraction of a preceding screen deck to the beginning of the next screen deck below when seen in the direction of flow. The oversize fraction travels over the screen deck without passing through. From the top deck, the coarsest fraction is often recycled to crushing.

Multi-deck screening separates plural different fractions by particle size. The different particle distributions are suited for different purposes. In a typical three-deck screen, the oversize fraction of the top deck is discharged with an oversize conveyor and the oversize fraction of the middle deck is separately discharged with a middle deck conveyor. For further crushing, it may be beneficial to direct the oversize conveyor sideways or even partly backwards for forming a crushing loop that returns the oversize after crushing to a feed of the oversize deck. The middle deck conveyor can be pivotably implemented to enable flexible piling to a desired direction.

Desired particle distributions may vary depending on current production needs. Sometimes, screen media may be changed to alter the particle size distributions of different screen deck undersize fractions. Also depending on application, intermediate crushing stages may be used.

The available mineral material, condition of crushing equipment, momentary energy price when using electricity for the crushing, current production demands, state of piles around the mobile screening apparatus and the state of transportation fleet may each influence on optimal configuration of the multi-deck screen.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first aspect there is provided a mobile multi-deck screening apparatus, comprising:

a feed configured to receive material for screening;

a first screen deck configured to receive the material from the feed;

a first discharge conveyor configured to output an oversize fraction of the first screen deck;

a second screen deck configured to receive an undersize fraction of the first screen deck; and a second discharge conveyor configured to output an oversize fraction of the second screen deck.

The first discharge conveyor may be pivotably mounted to operate in a direction selected between a first direction and a second direction, wherein the second direction differs from the first direction. The multi-deck screen may further comprise a first pivoting equipment configured to enable pivoting the first discharge conveyor to operate in a direction selected between the first direction and the second direction. The second direction may differ from the first direction. The first direction may be parallel to a longitudinal direction of the mobile multi-deck screening apparatus. The first direction may be substantially perpendicular to the longitudinal direction of the mobile multi-deck screening apparatus. The pivoting may occur in a horizontal plane. The second direction may deviate from the first direction by an angle that is less than 180 degrees. The second direction may deviate from the first direction by 90 degrees.

The second discharge conveyor may be pivotably mounted to operate in a direction selected between the first direction and the second direction. The multi-deck screen may further comprise a second pivoting equipment configured to enable pivoting the second discharge conveyor to operate in a direction selected between the first direction and the second direction.

The mobile screening apparatus may comprise co-piling equipment for selectively causing piling in a same pile oversize fraction material of the first screen deck and oversize fraction material of the second screen deck. The co-piling equipment may comprise means for steering two discharge conveyors to discharge material to the same pile. Alternatively, the co-piling equipment may comprise a combiner for combining at least portions of outputs of two or more screen decks to one discharge conveyor.

The first discharge conveyor and the second discharge conveyor may be stacked when in a same direction such as the first direction. The first discharge conveyor and the second discharge conveyor may be operable to discharge respective oversize fractions of the first screen deck and the second screen deck to a common pile when the first discharge conveyor and the second discharge conveyor are in a same direction. The first discharge conveyor and the second discharge conveyor may each have a feeding end and a discharging end. When stacked, the feeding ends of the first discharge conveyor and the second discharge conveyor may be aligned sideways in relation to the mobile screening apparatus. When stacked, the feeding ends of the first discharge conveyor and the second discharge conveyor may be aligned on a centerline of the first screen deck. When stacked, the feeding ends of the first discharge conveyor and the second discharge conveyor may be co-centric. The first discharge conveyor and the second discharge conveyor may share a same pivoting axis around which the first discharge conveyor and the second discharge conveyor and pivotable to operate in different directions.

By locating conveyors at the centerline of the screening apparatus, symmetricity can be enhanced in a frame structure of the mobile multi-deck screening apparatus. This may help in material flow controlling and/or reducing stress concentrations in the frame structure.

The first discharge conveyor and the second discharge conveyor may be aligned on a centerline of the first screen deck.

The first discharge conveyor and the second discharge conveyor may be pivotable so as to be aligned with each other.

The first discharge conveyor may be mounted to a frame with a slewing ring. The first pivoting equipment may comprise the slewing ring. The first discharge conveyor may be mounted to the frame with an upper mount. The first discharge conveyor may be mounted to the frame with a lower mount.

The second discharge conveyor may be mounted to a frame with a slewing ring. The second pivoting equipment may comprise the slewing ring. The second discharge conveyor may be mounted to the frame with an upper mount. The second discharge conveyor may be mounted to the frame with a lower mount.

The multi-deck screening apparatus may comprise a splitting arrangement configured to pass a portion of the oversize fraction of the first screen deck to the second discharge conveyor or to a third discharge conveyor below the second discharge conveyor. The splitting arrangement may comprise a controllable hatch. The controllable hatch may be controllable by tilting downwards to direct a split stream to the second discharge conveyor or to the first discharge conveyor depending on the angle of the controllable hatch.

The multi-deck screening apparatus may comprise a third screen deck configured to receive the undersize fraction of the second screen deck. The third screen deck may be further configured to output an oversize fraction to the third discharge conveyor.

The first discharge conveyor and the second discharge conveyor may have corresponding or matching shapes such that the first discharge conveyor and the second discharge conveyor may be pivoted and operated next to each other. The first discharge conveyor and the second discharge conveyor may have corresponding shapes such that the first discharge conveyor and the second discharge conveyor may be pivoted so that the second discharge conveyor is operated aligned with and under the first discharge conveyor. The first discharge conveyor and the second discharge conveyor may have substantially horizontal tail sections at their feed ends. The substantially horizontal tail section may refer to a tail section that has deviates from horizontal plane by an angle less than 15, 10 or 5% in flow direction. The deviation may be an inclination. An inclination of 15% may provide fair underneath space for folding to transport configuration while not incurring excessive abrasion by slipping material. A 5% or 10% inclination may further reduce abrasion while still leaving adequate folding space underneath.

The material may be mineral material. The material may be received from a crusher. The crusher may be a jaw crusher. The crusher may be a cone crusher. The crusher may be a gyratory crusher. The crusher may be a roller crusher. The crusher may be an impact crusher.

According to a second aspect there is provided a method in a mobile multi-deck screening apparatus, comprising:

- receiving material for screening with a feed of the apparatus;
- receiving and screening material from the feed by a first screen deck;
- outputting by a first discharge conveyor an oversize fraction of the first screen deck;
- receiving by a second screen deck an undersize fraction of the first screen deck; and
- outputting by a second discharge conveyor an oversize fraction of the second screen deck.

The method may further comprise any of:

- pivoting the first discharge conveyor to operate in a direction selected between a first direction and a second direction, which second direction differs from the first direction;
- pivoting the second discharge conveyor to operate in a direction selected between a first direction and a second direction, which second direction differs from the first direction;
- selectively discharging in a common pile oversize fraction material of the first screen deck and the oversize fraction material of the second screen deck;
- folding the first discharge conveyor over a horizontal axis in machine direction of the mobile screening apparatus for preparing the mobile screening apparatus to a transport configuration;
- folding the second discharge conveyor twice with each folding axis being horizontal and at perpendicular angle for preparing the mobile screening apparatus to a transport configuration.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which:

FIG. 8 shows a flow chart of a mobile screening process.

DETAILED DESCRIPTION

In the following description, like reference signs denote like elements or steps.

Figure 1:
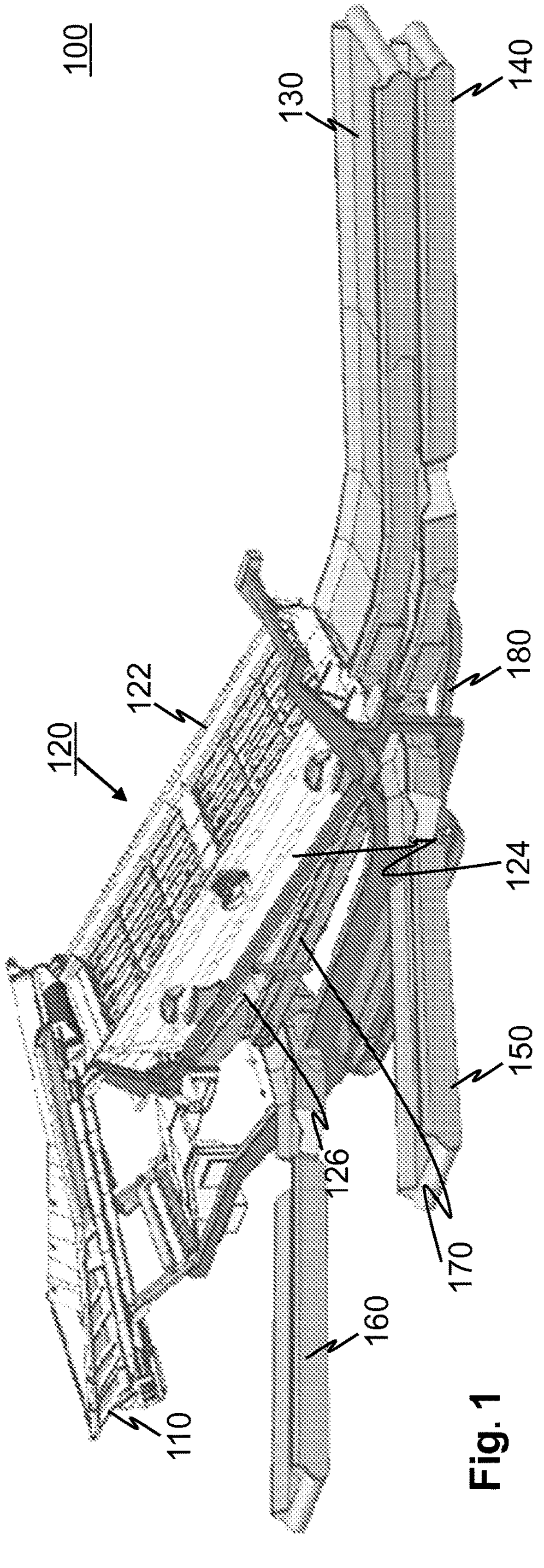
FIG. 1 shows a three-dimensional drawing of a mobile screening apparatus in a two-way split configuration combining oversize and middle deck oversize fractions.

FIG. 1 shows a three-dimensional drawing of a mobile screening apparatus 100 in a two-way split configuration combining oversize and middle deck oversize fractions. The apparatus comprises:

- 110: feed equipment of the apparatus, such as a feed hopper and a feed conveyor;

120: a multi-deck screen, comprising a first screen deck or oversize screen deck 122, a second screen deck 124 and a third screen deck 126;

130: a first discharge conveyor;

140: a second discharge conveyor, in this configuration aligned with the first discharge conveyor;

150: a third discharge conveyor, here turned to a sideways direction;

160: a fourth discharge conveyor, here turned to a sideways direction;

170: a fines conveyor under the third screen deck 126 for conveying undersize fraction of the third screen deck 126 to the fourth discharge conveyor;

180: body extending to support a discharge conveyor (here second discharge conveyor 140).

Material consisting of rock material and/or sand in a variety of fractions is fed on the feeder 110, for example, by a wheel loader or an excavator.

The feeder 110 feeds material to the first screen deck 122. Oversize material i.e., oversize material that does not pass the apertures of the screen deck 122 will be moved towards the feeding end of the first discharge conveyor 130.

Figure 2:
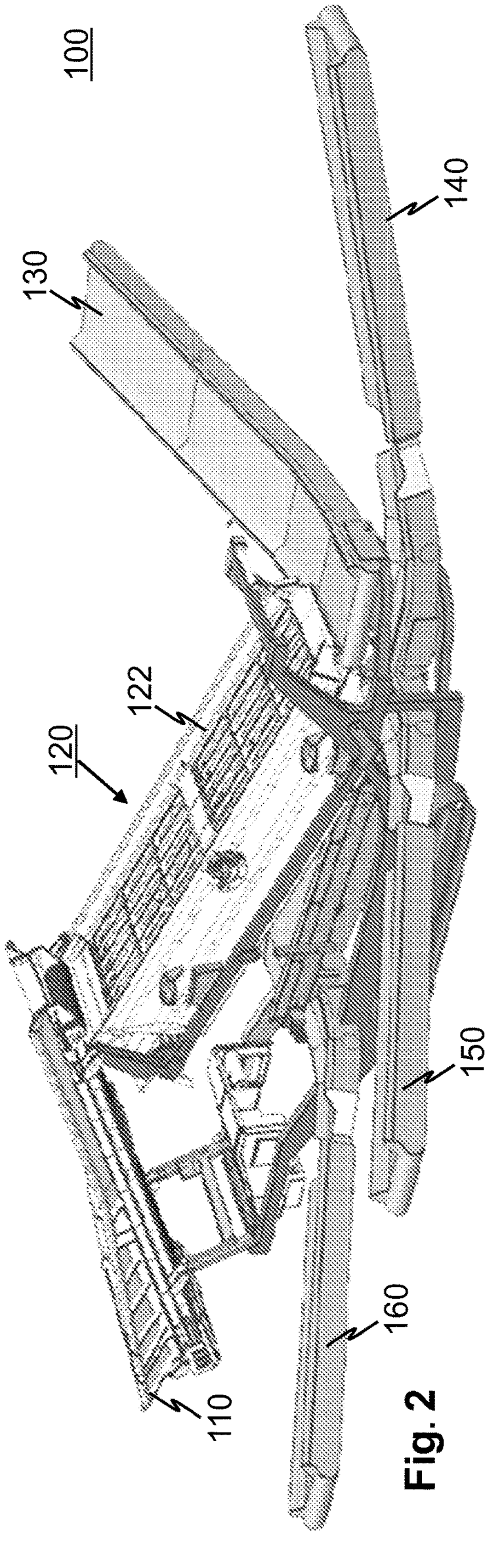
FIG. 2 shows a three-dimensional drawing of a mobile screening apparatus in another configuration separating different fractions to different discharge regions.

FIG. 2 shows a three-dimensional drawing of a mobile screening apparatus in another configuration separating different fractions to different discharge regions. In FIG. 2, the first discharge conveyor 130 is turned to a sideways direction (second direction) on a first side of the mobile screening apparatus. In FIG. 2, the second discharge conveyor 140 is directed forward to a first direction. The second discharge conveyor 140 is also pivotable to the first direction. One or both of the first and second discharge conveyors 130, 140 is pivotable further to a third direction on a second side, that is opposite to the first side. The third direction may be opposite to the second direction. The second and third directions surround the first direction, i.e. a discharge conveyor pivoting between the second and third directions pivots over the first direction. The third discharge conveyor 150 direction is also drawn in FIGS. 1 and 2 as directed to the third direction. The directions preferable reside in a horizontal plane so that the pivoting of the conveyors would not change potential energy of pivoted mass, if the mobile screening apparatus is horizontally aligned when operating.

Figure 3:
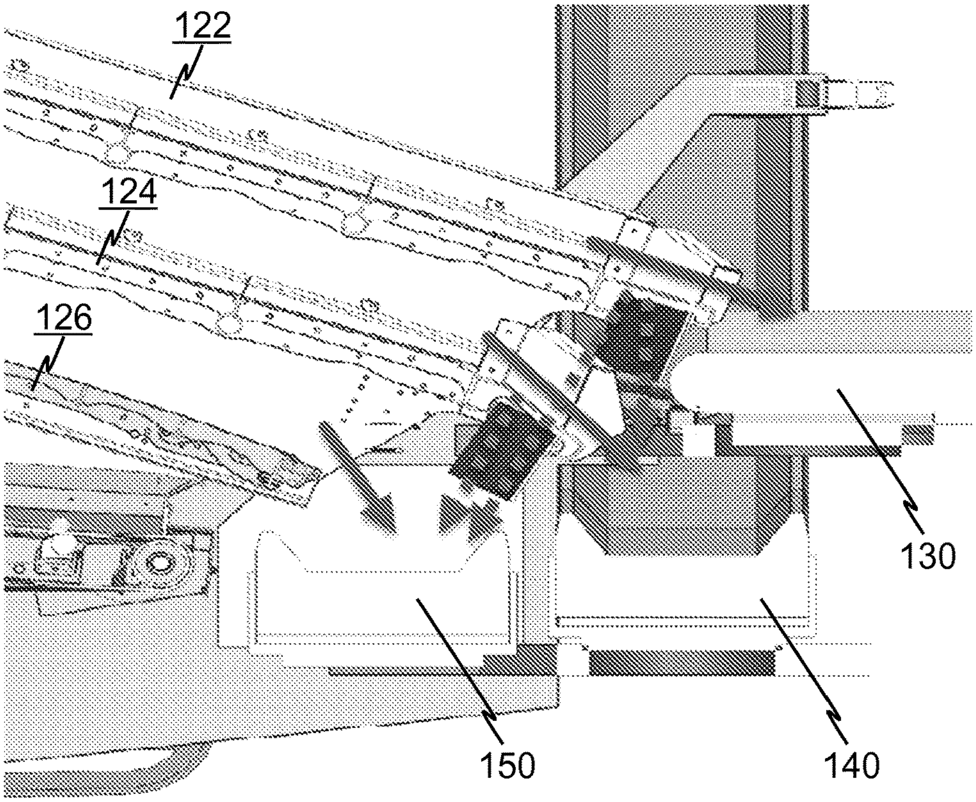
FIG. 3 shows a schematic side view of some material dividing and blending alternatives.

FIG. 3 shows a schematic side view of some material dividing and blending alternatives. Solid arrows are drawn to illustrate a normal exit path of oversize fractions from the first to third screen decks 122, 124 and 126, respectively. Oversize material or oversize fraction of screen deck 126 falls to conveyor 150 and undersize material passing through the screen deck 126 falls on conveyor 170 (see FIG. 1) below the screen deck 126. Dashed arrows illustrate alternative paths that can be produced with a splitting arrangement illustrated in FIG. 4 with one example implementation.

Figure 4:
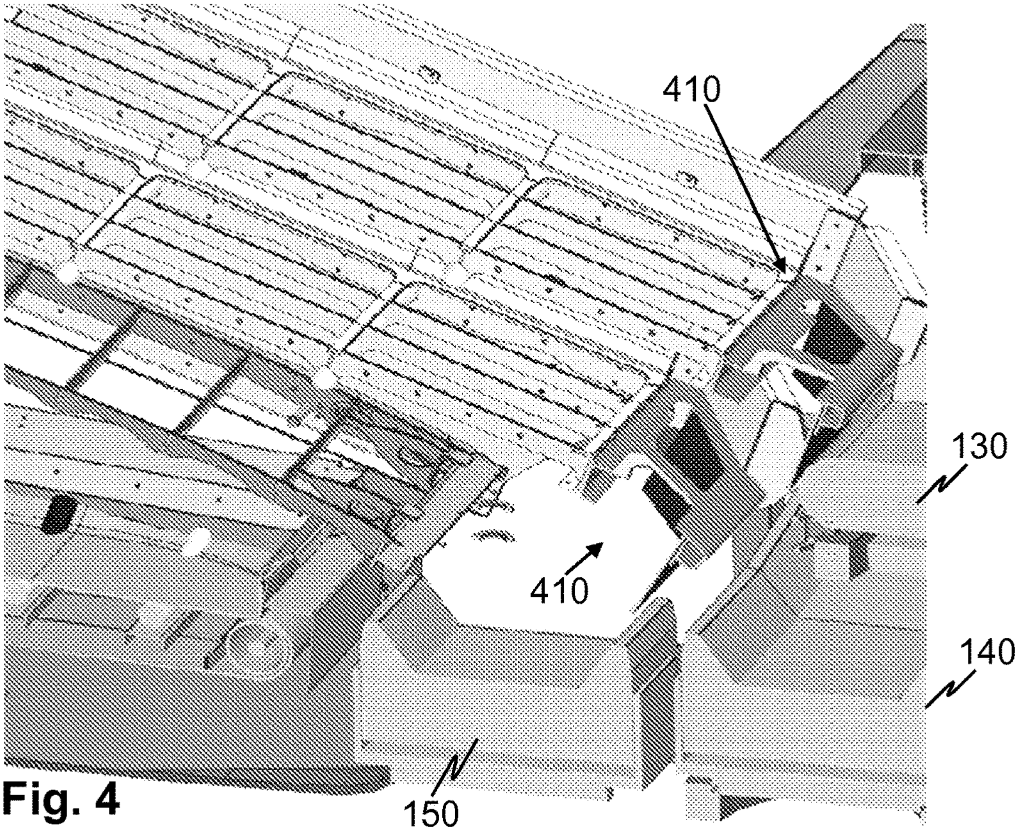
FIG. 4 shows a three-dimensional view of some material dividing and blending structures.

FIG. 4 shows a three-dimensional view of some material dividing and blending structures usable for implementing a splitting arrangement. The first screen deck exit is provided with controllable plate systems or chutes that enable directing either or both of a left-hand side stream and a right-hand side stream to any of the first discharge conveyor 130, the second discharge conveyor 140 or the third discharge conveyor 150.

FIG. 4 illustrates three apertures between the screen deck and the conveyor: one on the left-hand side, one in the middle and on the right-hand side. These apertures may be openable and closable by removable plates, for example.

Figure 5:
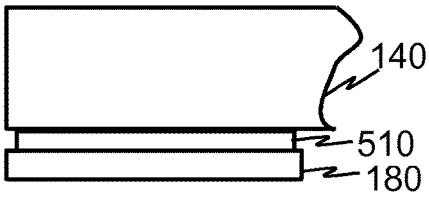
FIG. 5 shows details of a pivotable mounting of a discharge conveyor.

FIG. 5 shows details of a pivotable mounting of a discharge conveyor, such as the first discharge conveyor 130, the second discharge conveyor 140 or the third discharge conveyor 150. The discharge conveyor, in this example the second discharge conveyor 140, is mounted to the body 180 via a slewing ring 510 to allow rotational movement or pivoting of the discharge conveyor as desired.

Figure 6:
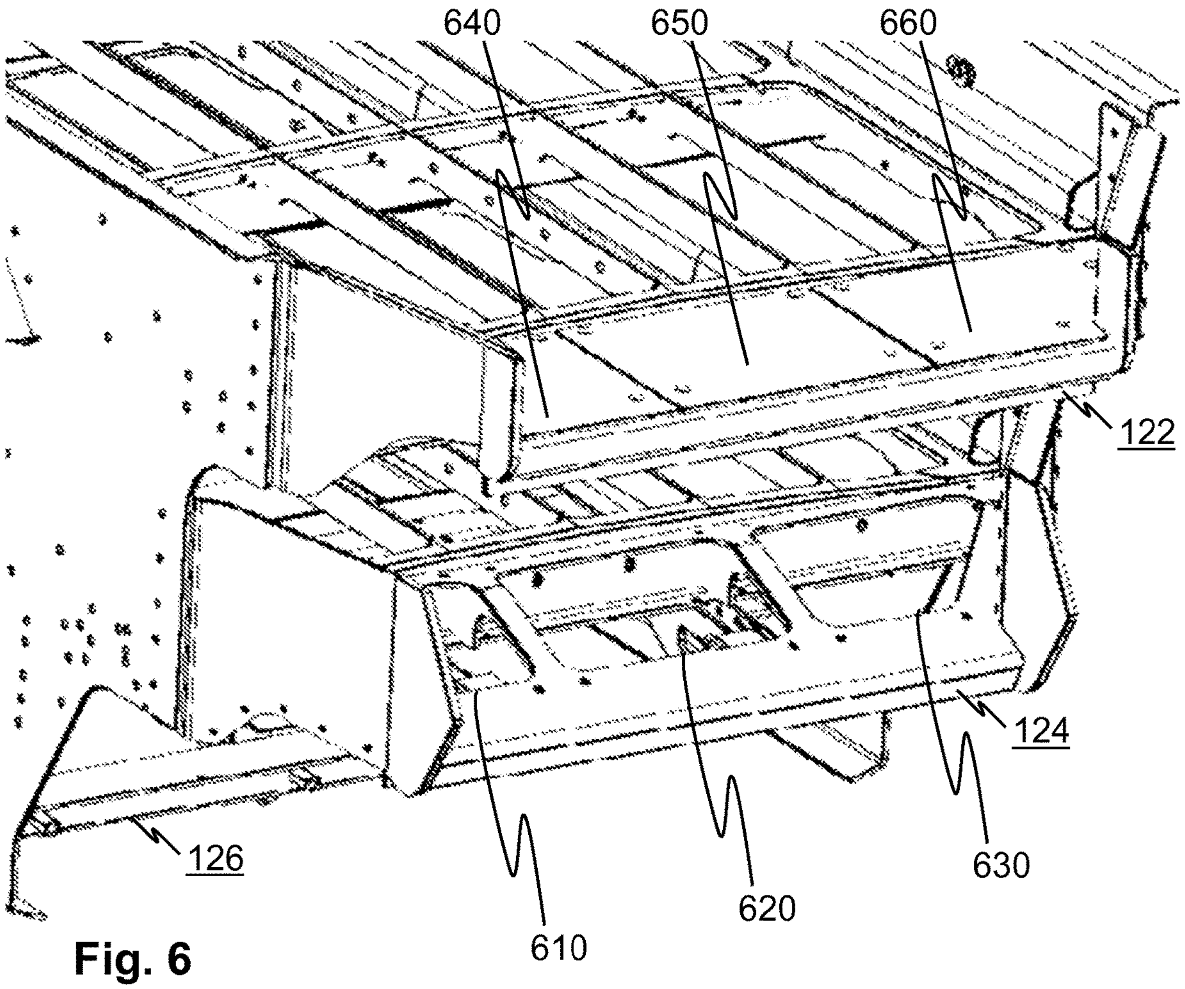
FIG. 6 shows a three-dimensional drawing of the dividing and blending structures of FIG. 4 in another configuration.

FIG. 6 shows a three-dimensional drawing of the dividing and blending structures of FIG. 4 in another configuration. FIG. 6 shows two adjustable chutes for first and second screen decks 122, 124, respectively. In each of these chutes, there are a plurality of aperture forming structures 610 to 630 each of which can be covered individually by a respective closing structure such as plates 640 to 660. Notably, the chutes need not be of same shape or size and the different aperture structures may form apertures of different sizes. While in FIG. 6 first and second screen decks 122, 124 all of the aperture structures of one screen deck are closed or open, in other configurations only some of the aperture structures are covered or blocked to lead a portion of the oversize material to a discharge conveyor ahead and to let another portion of the oversize material to fall down onto one or more subsequent screen deck's discharge conveyor.

FIG. 6 also shows that the outputs of the first and second screen decks 122, 124 may extend laterally to different extents or to similar extent. In some cases, it can be useful to allow (at least some) oversize material of the first screen deck 122 fall through the aperture structures of the first screen deck 122 and also through the aperture structures of the second screen deck 124 so as to combine with the oversize material of the third screen deck 126.

By enabling adjustable mixing of some oversize material of different decks, desirable new screening blends can be produced without separate mixing. For example, by mixing larger particle sized oversize fractions of the first and second screen decks 122, 124 with the finer oversize fraction of the third screen deck 126, a desirable combination of load bearing and settling of the blend can be attained for road or railroad structure or concrete production.

Figure 7:
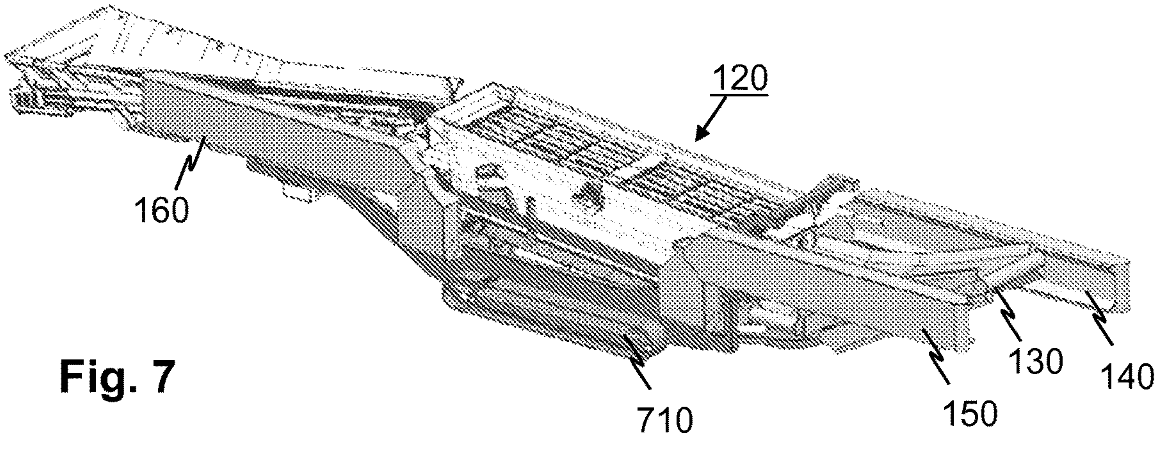
FIG. 7 shows a three-dimensional drawing of a mobile screening apparatus in a transport configuration.

FIG. 7 shows a three-dimensional drawing of a mobile screening apparatus in a transport configuration. The second to fourth exit conveyors 140, 150, 160 are each turned by two transportation joints up and sideways (in either order). The first exit conveyor 130 is directed forward and folded to reduce the length of the entire apparatus suitably for towing with normal trucks on a semi-trailer. FIG. 7 further shows a track base 710 of the mobile screening apparatus. Alternatively, the mobile screening apparatus may comprise wheels or skids for on-site transfers.

FIG. 8 shows a flow chart of a mobile screening process in a mobile screening apparatus, illustrating:

805. receiving material for screening with a feed of the apparatus;

810. receiving and screening material from the feed by a first screen deck;

815. outputting by a first discharge conveyor an oversize fraction of the first screen deck;

820. receiving by a second screen deck an undersize fraction of the first screen deck;

825. outputting by a second discharge conveyor an oversize fraction of the second screen deck;

830. pivoting the first discharge conveyor to operate in a direction selected between a first direction and a second direction, which second direction differs from the first direction; in an example embodiment with a freely selected angle or with two or more steps between the first direction and the second direction;

835. pivoting the second discharge conveyor to operate in a direction selected between a first direction and a second direction, which second direction differs from the first direction; in an example embodiment with a freely selected angle or with two or more steps between the first direction and the second direction;

845. selectively discharging in a common pile the oversize fraction of the first screen deck and the oversize fraction of the second screen deck;

840. pivoting one or both of the first and second discharge conveyors from a first side of the mobile multi-deck screening apparatus to an opposite second side of the mobile multi-deck screening apparatus;

850. folding the first discharge conveyor over a horizontal axis in a forward direction for preparing the mobile screening apparatus to a transport configuration;

855. folding the second discharge conveyor twice with each folding axis being horizontal and at a perpendicular angle for preparing the mobile screening apparatus to a transport configuration.

In an embodiment, the process excludes step 845. In an embodiment, the process alternatively or additionally excludes step 850. In an embodiment, the process alternatively or additionally excludes step 855.

Advantageously, the mobile multi-deck screening apparatus may enable the co-piling with at least one of the discharge conveyors that is pivoted into any direction between the second and third direction. The mobile multi-deck screening apparatus may comprise a mobile platform providing forward and backward movement either by self-propelling or towing. In either case, the allowing of co-piling onto either side of the mobile multi-deck screening apparatus facilitates piling on either side without maneuvering the mobile multi-deck screening apparatus.

Various embodiments have been presented. It should be appreciated that in this document, words comprise, include, and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A mobile multi-deck screening apparatus, comprising:

a feeder configured to receive material for screening;

a first screen deck configured to receive the material from the feeder;

a first discharge conveyor configured to output an oversize fraction of the first screen deck;

a second screen deck configured to receive an undersize fraction of the first screen deck;

a second discharge conveyor configured to output an oversize fraction of the second screen deck;

the first discharge conveyor being pivotably mounted to operate in a direction selected between a first direction and a second direction, wherein the second direction differs from the first direction;

the second discharge conveyor being pivotably mounted to operate in a direction selected between the first direction and the second direction;

at least one of the first and second discharge conveyors being pivotably mounted to operate further in a direction selected between the first direction and a third direction;

the first direction being between the second and third directions;

the first direction being forward;

the second and third directions pointing to opposite sides of the mobile multi-deck screening apparatus;

wherein when the first discharge conveyor and the second discharge conveyor are in a same direction, the first discharge conveyor and the second discharge conveyor are stacked and the feeding ends of the first discharge conveyor and the second discharge conveyor are concentric; and the mobile multi-deck screening apparatus further comprising co-piling equipment selectively causing piling in a same pile oversize fraction material of the first screen deck and oversize fraction material of the second screen deck; wherein the co-piling equipment comprises the first discharge conveyors and the second discharge conveyor directed to discharge material to the same pile, when the first discharge conveyor and the second discharge conveyor are in a same direction.

2. The mobile multi-deck screening apparatus of claim 1, wherein the co-piling equipment is configured to cause piling in a same pile oversize fraction material of the first screen deck and oversize fraction material of the second screen deck using at least one of the first and second discharge conveyors on either side of the mobile multi-deck screening apparatus.

3. The mobile multi-deck screening apparatus of claim 1, wherein the co-piling equipment comprises a combiner for combining at least portions of outputs of two or more screen decks to one discharge conveyor.

4. The mobile multi-deck screening apparatus of claim 1, further comprising a splitting arrangement configured to pass a portion of the oversize fraction of the first screen deck to the second discharge conveyor.

5. The mobile multi-deck screening apparatus of claim 1, wherein:

the mobile multi-deck screening apparatus comprises a third screen deck configured to receive the undersize fraction of the second screen deck; and the third screen deck is further configured to output an oversize fraction to a third discharge conveyor.

6. The mobile multi-deck screening apparatus of claim 4, further comprising a splitting arrangement configured to pass a portion of the oversize fraction of the first screen deck to a third discharge conveyor below the second discharge conveyor.

7. The mobile multi-deck screening apparatus of claim 5, wherein the splitting arrangement comprises a controllable hatch.

8. A mobile multi-deck screening apparatus, comprising:

a feeder configured to receive material for screening;

a first screen deck configured to receive the material from the feeder;

a first discharge conveyor configured to output an oversize fraction of the first screen deck;

a second screen deck configured to receive an undersize fraction of the first screen deck;

a second discharge conveyor configured to output an oversize fraction of the second screen deck;

the first discharge conveyor being pivotably mounted to operate in a direction selected between a first direction and a second direction, wherein the second direction differs from the first direction;

the second discharge conveyor being pivotably mounted to operate in a direction selected between the first direction and the second direction;

at least one of the first and second discharge conveyors being pivotably mounted to operate further in a direction selected between the first direction and a third direction;

the first direction being between the second and third directions;

the first direction being forward;

the second and third directions pointing to opposite sides of the mobile multi-deck screening apparatus;

wherein the first discharge conveyor and the second discharge conveyor have matching shapes such that the first discharge conveyor and the second discharge conveyor can be pivoted so that the second discharge conveyor is operated aligned with and under the first discharge conveyor the mobile multi-deck screening apparatus further comprising co-piling equipment selectively causing piling in a same pile oversize fraction material of the first screen deck and oversize fraction material of the second screen deck; wherein the co-piling equipment comprises the first discharge conveyors and the second discharge conveyor directed to discharge material to the same pile, when the first discharge conveyor and the second discharge conveyor are in a same direction.

9. The mobile multi-deck screening apparatus of claim 1, wherein the first discharge conveyor and the second discharge conveyor have substantially horizontal tail sections at their feed ends.

10. A method in a mobile multi-deck screening apparatus, comprising:

receiving material for screening with a feeder of the apparatus;

receiving and screening material from the feed by a first screen deck;

outputting by a first discharge conveyor an oversize fraction of the first screen deck;

receiving by a second screen deck an undersize fraction of the first screen deck;

outputting by a second discharge conveyor an oversize fraction of the second screen deck;

pivoting the first discharge conveyor to operate in a direction selected between a first direction and a second direction, which second direction differs from the first direction;

pivoting the second discharge conveyor to operate in a direction selected between a first direction and a second direction;

pivoting at least one of the first and second discharge conveyors to operate further in a direction selected between the first direction and a third direction, the first direction being between the second and third directions and the second and third directions pointing to opposite sides of the mobile multi-deck screening apparatus; and selectively discharging in a common pile oversize fraction material of the first screen deck and oversize fraction material of the second screen deck;

wherein the first direction is forward;

the method further comprising pivoting one or both of the first and second discharge conveyors from one side of the mobile multi-deck screening apparatus to an opposite second side; wherein in that the method further comprises discharging material to the same pile by the first and second discharge conveyors, when the first discharge conveyor and the second discharge conveyor are in a same direction; and supporting the first discharge conveyor and the second discharge conveyor so that when the first discharge conveyor and the second discharge conveyor are in a same direction, the first discharge conveyor and the second discharge conveyor are stacked and the feeding ends of the first discharge conveyor and the second discharge conveyor are concentric.

11. The method of claim 10, further comprising combining at least portions of outputs of two or more screen decks to one discharge conveyor.

12. The method of claim 10, further comprising folding the first discharge conveyor over a horizontal axis in a machine direction of the mobile multi-deck screening apparatus for preparing the mobile screening apparatus to a transport configuration.

13. The method of claim 10, further comprising folding the second discharge conveyor twice with each folding axis being horizontal and at a perpendicular angle for preparing the mobile screening apparatus to a transport configuration.

* * * * *